United States Patent [19]
Spendell

[11] Patent Number: 5,257,538
[45] Date of Patent: Nov. 2, 1993

[54] GAS CONSUMPTION MEASURING DEVICE

[75] Inventor: Karl D. Spendell, Nuremberg, Fed. Rep. of Germany

[73] Assignee: Siemens Aktiengesellschaft, Munich, Fed. Rep. of Germany

[21] Appl. No.: 939,959

[22] Filed: Sep. 4, 1992

Related U.S. Application Data

[63] Continuation of Ser. No. 624,072, Dec. 4, 1990, abandoned.

[30] Foreign Application Priority Data

Apr. 12, 1989 [DE] Fed. Rep. of Germany .................... 89312637[U]

[51] Int. Cl.$^5$ ............................................. G01F 15/00
[52] U.S. Cl. ........................................ 73/198; 73/273
[58] Field of Search ................. 73/195, 198, 199, 201, 73/273

[56] References Cited

U.S. PATENT DOCUMENTS

| | | | |
|---|---|---|---|
| 3,894,432 | 7/1975 | Coughlin | 73/201 |
| 4,174,733 | 11/1979 | Eidsmore et al. | 73/199 X |
| 4,782,697 | 11/1988 | Williams, III | 73/861.27 X |
| 5,003,810 | 4/1991 | Jepson et al. | 73/195 X |

FOREIGN PATENT DOCUMENTS

| | | |
|---|---|---|
| 991441 | 6/1970 | Canada . |
| 0243294 | 10/1987 | European Pat. Off. . |
| 0303255 | 8/1988 | European Pat. Off. . |
| 612278 | 4/1935 | Fed. Rep. of Germany . |
| 803492 | 7/1949 | Fed. Rep. of Germany . |
| 1698463 | 12/1970 | Fed. Rep. of Germany . |
| 2215758 | 3/1988 | United Kingdom . |

Primary Examiner—Herbert Goldstein
Attorney, Agent, or Firm—Kenyon & Kenyon

[57] ABSTRACT

A compact gas consumption measuring device which is flexibly insertable into existing gas installations includes in a single compact housing, a permanently installed flowmeter, and a pressure-control device and a shut-off valve, which are modularly constructed in two parts. Additionally, several spatially staggered gas admission and gas discharge ports are provided. To this end, the housing possesses, on the front side, slide-in openings into which one basic module each is inserted and secured. Assigned to each basic module are a function module and a blank module which, depending on the requirement, are insertable into the basic module and are sealable gastight to the outside. The basic modules and the assigned function modules are each provided with a gas intake and gas discharge wells and are connected to each other in such a way that they are connected in series to the flowmeter as well as to the connecting ports for gas admission and for gas exhaust.

16 Claims, 3 Drawing Sheets

GAS CONSUMPTION MEASURING DEVICE

This application is a continuation of application Ser. No. 07/624,072, filed on Dec. 4, 1990, now abandoned.

BACKGROUND OF THE INVENTION

The present invention relates to a gas consumption measuring device and more particularly to a modular design for such a device.

Gas consumption measuring devices with a permanently installed flow meter usually consist of a reservoir, sealed gastight, an admission pipe, an exhaust pipe, and a flowmeter with an indicating device. A shut-off valve is included in the supply line leading to the measuring device, so that, gas supply to the device can be cut off using the shut-off valve, and if necessary. If desired, the supply line can be fitted with a pressure-control device in addition to the shut-off valve.

German Patent 803 492 discloses a secondary-counter device for measuring gas consumption, including a flowmeter combined with a shut-off valve to form a single unit.

Furthermore, a gas consumption meter is known from the German Printed Patent 16 98 463. In this example, a flowmeter is accommodated, along with a pressure-control device, in a mutual housing.

These two known devices have a common disadvantage. Each requires extensive installation work and associated expenses to install them into an existing gas installation. Thus, for example, to desire installing a flowmeter and a pressure-control device at an existing gas installation that only has a shut-off valve is not uncommon. To this end, either the installation is fitted with the two elements, each one by itself, or a combination configuration like that disclosed in the German Printed Patent 16 98 463 is used. A similar problem arises where an existing installation has a pressure-control device and installing a flowmeter having an associated shut-off valve is desired. In both instances, either the expenditure for assembly is relatively high, or special equipment combinations, which are usually costly, must be made available.

SUMMARY OF THE INVENTION

The present invention overcomes the problems of these prior art systems, clearly reducing the installation expenditure required to modify gas installations in comparison with prior modification or installation methods. Simultaneously the present invention provides a flexible uniform device, adaptable to existing installations and therefore inexpensive, The flexible uniform device is adaptable to the special requirements for a given installation with little manipulation.

The present invention provides a gas consumption measuring device including a housing, a housing gas admission port and a housing gas exhaust port. A flowmeter is permanently installed in the housing. The housing has first and second slide-in openings on the front side of the housing. A slide valve basic module is inserted in the first slide-in opening and is releasably secured to the housing. A pressure-control device basic module is inserted in the second slide-in opening and is releasably secured to the housing. A slide valve function module is detachably inserted in the slide valve basic module. A pressure-control device function module is detachably inserted in the pressure-control device basic module. Each of the function modules have a gas admission port and a gas exhaust port. Together the slide valve basic module and the slide valve function module constitute a shut-off valve. Together the pressure-control device basic module and the pressure-control device function module constitute a pressure-control device. The shut-off valve and the pressure-control device are connected in series, in a gas conducting manner, to each other and to the housing gas admission port and the housing gas exhaust ports. Each of the function modules is replaceable with a respective blank module insertable into the respective basic module to be gas tight to the outside of the housing. This new configuration provides that the components, still required in addition to the flowmeter, such as a shut-off valve and pressure-control device, can be accommodated compactly in a mutual housing. At the same time, the modular construction of these components permits the total configuration to be flexibly adapted to prevailing local conditions while expending minimal amounts of energy and effort. Moreover, in spite of its functional flexibility, the measuring device can be accommodated in a uniform, compact housing. Therefore, exactly to planning the installation work in advance and carry the installation work out with a minimum degree of complexity is possible, since the space required for the entire module is always constant. Also, the space required to stock spare parts for the various elements is minimized.

Also, the flexibility provided by the present invention permits easy adaptation to the specific requirements of a given gas installation at the installation with little manipulation and reduced need for prior plans for overall design changes.

In a further development of the present invention, a flowmeter is an ultrasonic flowmeter powered by a replaceable battery. The battery is also arranged in the housing. A flowmeter based on the ultrasonic delay time principle is generally known, for instance from the EP-A-0 303 255. This type of ultrasonic flowmeter is very compact and can be easily combined with the other components in a single housing, in a space-saving manner.

The housing of the device may include a plurality of right-angled wall elements provided with a group of connecting ports for gas admission and a second group of connecting ports for gas exhaust. The groups are connected by gas conductors in the housing and ports other than those in use are sealably gastight. Such a measuring device can be inserted into an existing pipe run with a minimum amount of extra work for installation.

The gas admission and gas exhaust or discharge ports can lie on different planes of a housings cross section. Furthermore, a ring seal can be arranged between the two planes of cross section. This configuration prevents the gas inside the module from to directly attaining the gas exhaust port from the gas intake port by way of the wall clearance.

DETAILED DESCRIPTION

Figure 1:
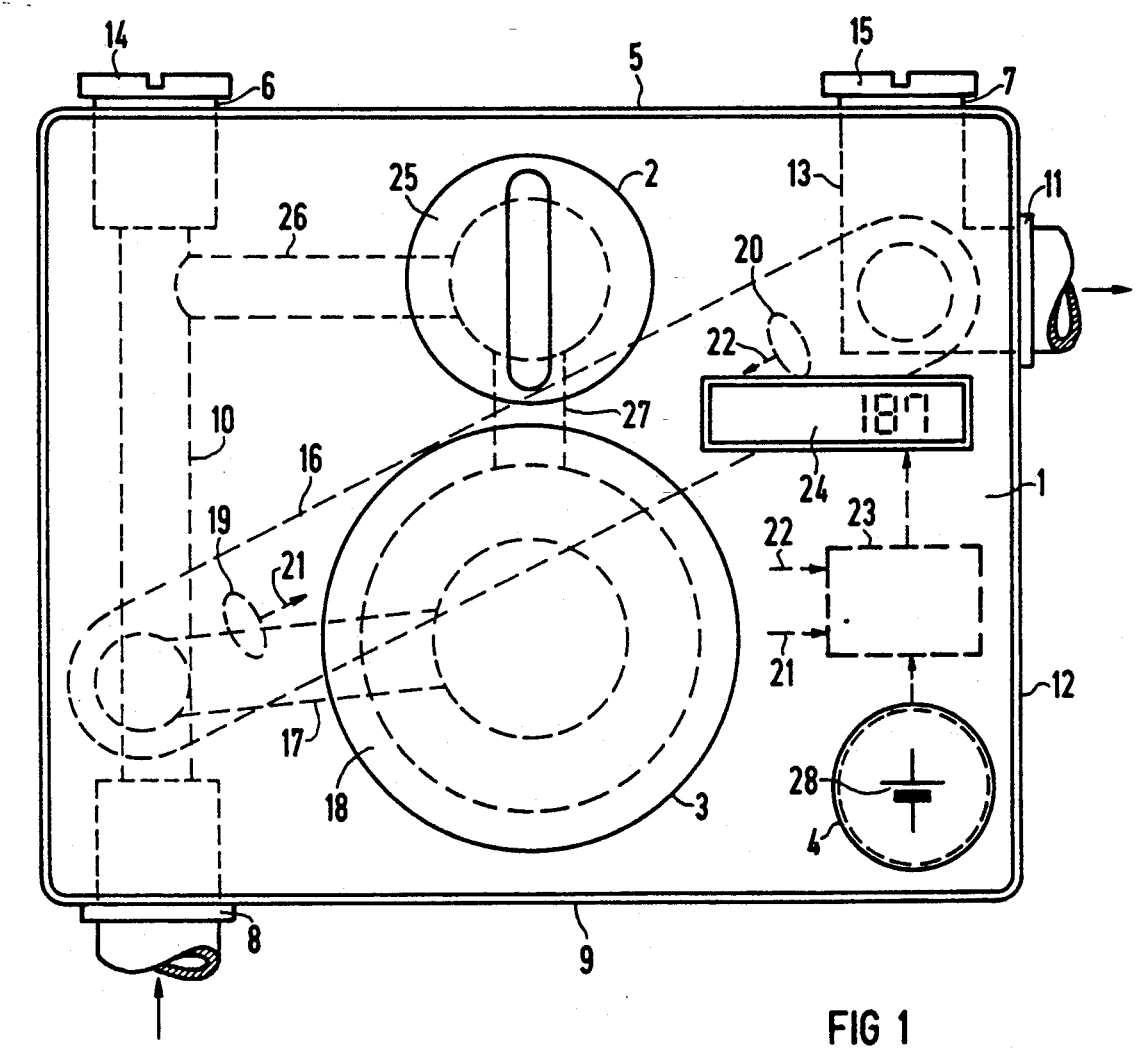
FIG. 1 illustrates a spatial general view of modularly constructed gas consumption measuring device according to an embodiment of the present invention.

A modularly constructed gas consumption measuring device according to the present invention is depicted in FIG. 1. The device possesses a housing 1, provided with a first frontal slide-in opening 2 for mounting a shut-off valve, a second frontal slide-in opening 3 for mounting a gas pressure-control device, and a third frontal slide-in opening 4 for accommodating an electrical power source such as a current source. In addition, the housing 1 has a first sealable gas admission port 6 and a first sealable gas exhaust port 7 on its top side 5. A second sealable gas admission port 8 on the bottom side 9 of the housing 1 leads to the outside of the housing 1 and is connected, by way of a first connecting pipe 10, to the first gas admission port 6. A second sealable gas exhaust port 11 leads through a side wall 12 of the housing to the outside of housing 1. The second gas exhaust port 11 is connected to the first gas exhaust port 7 via an angular connecting pipe 13. Of course, configuring additional interconnected gas admission and gas exhaust ports is also possible if desired. In that instance, sealing the unused ports gastight and lead-sealing them with the help of screw caps 14, 15 would be appropriate. The unsealed ports 8 and 11 can be connected to a gas supply line, and to the outgoing gas line, respectively, in a manner not illustrated.

Inside the housing 1, an ultrasonic flowmeter 6 is configured diagonally on a rear side of an housing. It is connected, on the intake side, via a second connecting pipe 17 to a basic module 18 of a pressure-control device and on an exhaust side to the angular connecting pipe 13 of the gas discharge ports 7, 11. The ultrasonic flowmeter 16 possesses two ultrasonic measuring sensors, 19 and 20, configured at the ends of a measuring section of the flowmeter. The measuring sensors are connected via connecting lines 21, 22 to an electronic evaluation circuit 23. The evaluation of circuit 23 is connected to a display 24 to indicate the gas quantity consumed at the installation. The basic module 18 of the pressure-control device is connected in a gas-conducting manner via a third connecting pipe 27 to the basic module 25 of the shut-off valve. The basic module 25 of the shut-off valve is connected via a fourth connecting pipe 26 to the first connecting pipe 10. The electronic evaluation circuit 23 is powered by a battery 28 configured in the third frontal slide-in opening 4.

Figure 2:
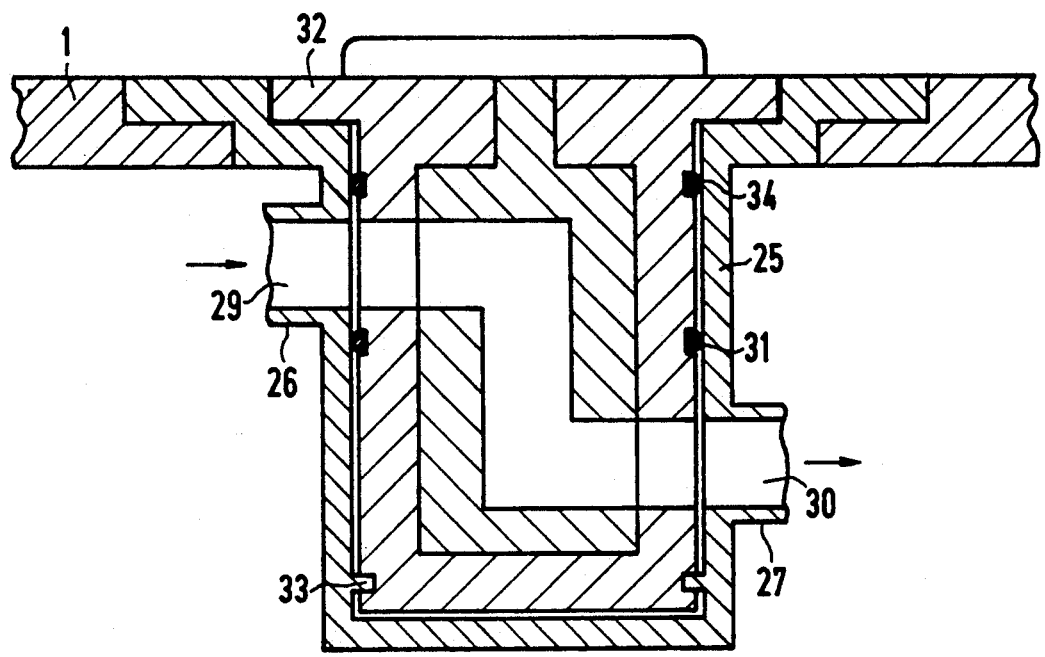
FIG. 2 illustrates a basic configuration of a modularly constructed shut-off valve in accordance with an embodiment of the present invention.

FIG. 2 illustrates a longitudinal section of the first frontal slide-in opening 2 with the slide valve basic module 25 inserted in the opening and a slide valve function module 32 inserted in the slide valve basic module 25. The slide valve basic module 25 is a cup-shaped hollow cylinder, provided with a first gas intake well 29 and a first gas discharge well 30 in different horizontal planes. A first O-ring seal 31 is configured between the two planes. This O-ring seal 3 prevents a gas-conducting creeping connection when the slide valve function module 32 is inserted between the gas intake well 29 and the gas discharge well 30. The fourth connecting pipe 26 of FIG. 1 is set gas-tight with the first gas intake well 29 and the fourth connecting pipe 27 of FIG. 1 is set gas-tight with the first gas discharge well 30. With the help of a bayonet catch 33, the slide valve function module 32 is detachably secured in the slide valve basic module 25. The function of the slide valve function module 32 is known and therefore does not require any further classification. A second O-ring seal 34 between the first gas intake well 29 and the top edge of the shut off valve basic module provides for the gas sealing action to the outside.

Figure 3:
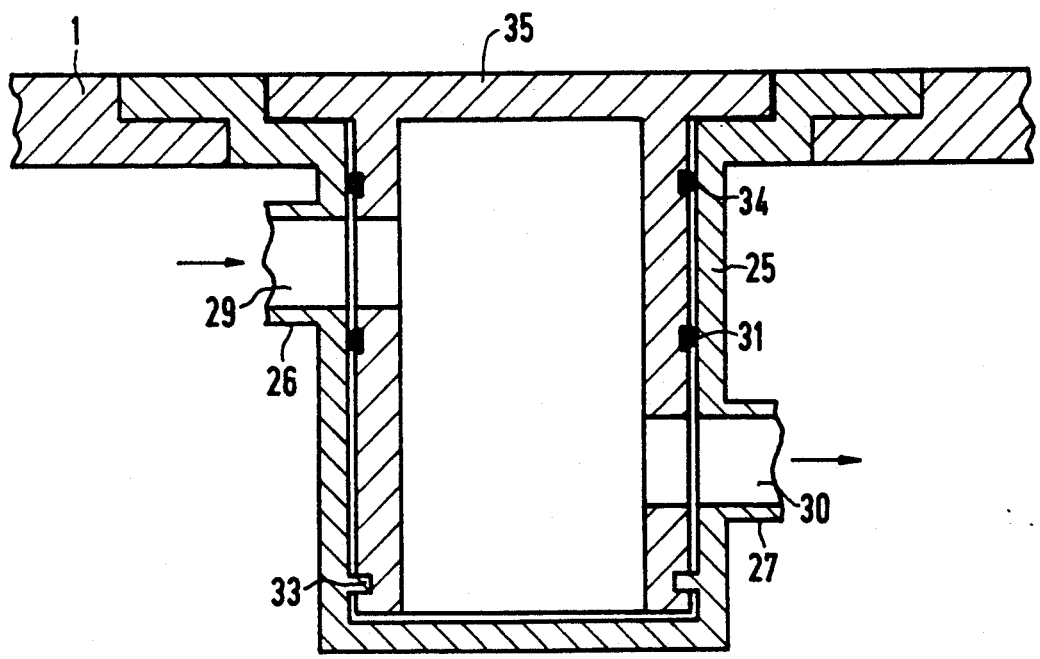
FIG. 3 illustrates a blank module used in place of the shut-off valve of FIG. 2.

FIG. 3 illustrates an installation configuration where the slide valve function module 32 is not needed. The slide valve function module is not required when an external slide valve is already available for use. Here, a slide valve blank module 35 of the same geometric measurement and the same outer form, as well as the same gas intake and gas discharge wells and first and second O-ring seals 31, 34 configured in the same horizontal planes, and finally with the same bayonet catch 33 as slide valve function module 32, can be inserted in and secured to the slide valve basic module 25 in place of the slide valve function module 32. As a result, the gas consumption measuring device can be used with or without a slide valve function module, since it can be replaced, by a considerably less expensive blank module 35. Should the installation be modernized, exchanging the blank module 35 for a function module 32 as illustrated in FIG. 2 is always possible.

Figure 4:
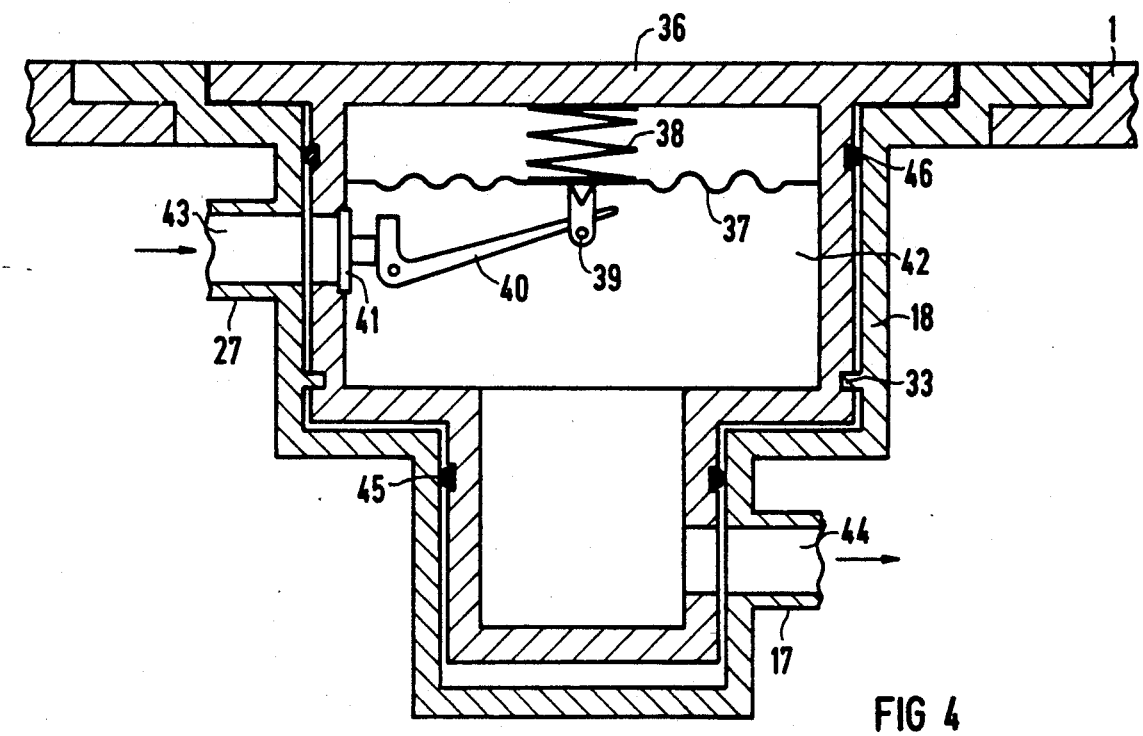
FIG. 4 illustrates a modularly constructed gas pressure-control device in accordance with an embodiment of the present invention.
Figure 5:
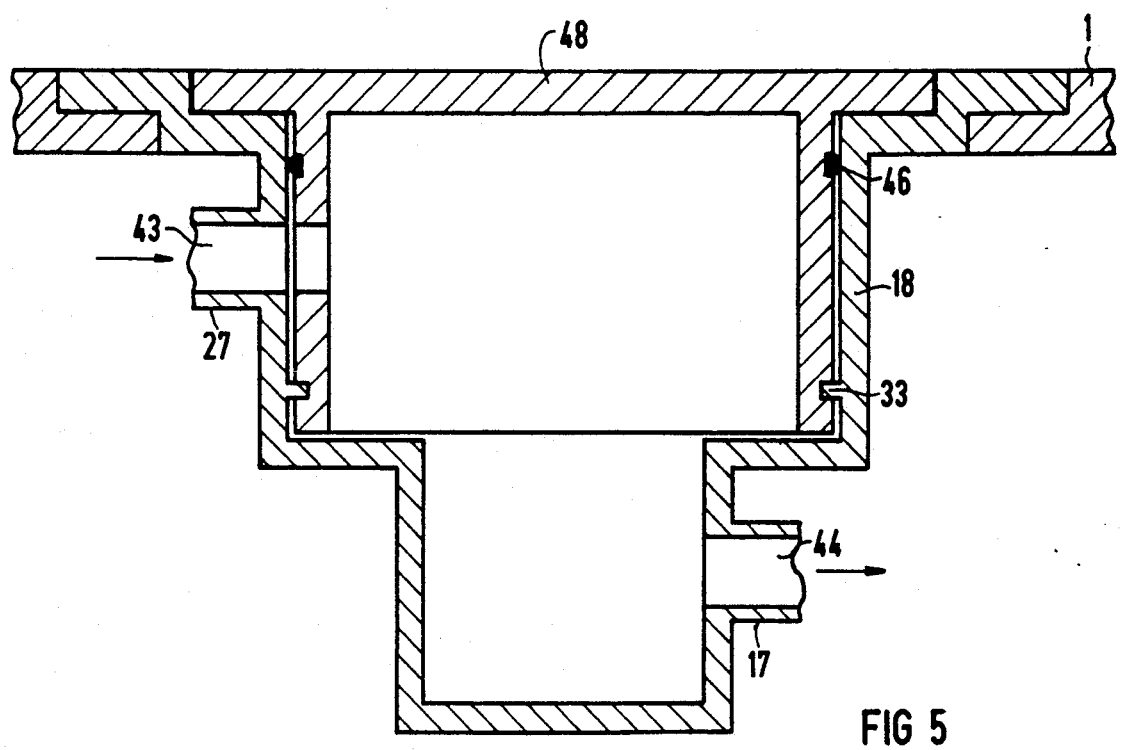
FIG. 5 illustrates a blank module used in place of the gas pressure-control device of FIG. 4.

The same basic concept applies to the pressure-control device function module 36 depicted in FIG. 4. Such a pressure-control device is known in principle. It consists of a membrane 37, which works against a spring 38 and acts, by way of an actuating mechanism 39, upon a turning lever 40. The turning lever 40 regulates via a valve 41 the gas intake depending upon the pressure prevailing in the pressure chamber 42. The pressure-control device function module 36 is mounted and supported in the pressure-control-device basic module 17 with the help of a bayonet catch 33 in the same way as the slide valve function module 32 is mounted in the slide valve basic module 25 as described above. The pressure-control device basic module 17 has a second gas intake well 43 and a second gas discharge well 44. Both wells lie in different horizontal planes and are separated in a gas tight manner from each other by means of a third O-ring seal 45. A fourth O-ring seal 46 provides the gas sealing action to the outside. If another pressure-control device is already present in an existing gas installation, then in this case as well, as the case of the slide valve function module, already described, a pressure-control device blank module 48 can be inserted in place of the pressure-control-device function module 36. The blank module 48 has the same geometric measurement as the pressure-control-device function module 36 and can be introduced in and secured to the pressure-control-device basic module 18 in the same manner.

Since connecting the gas lines to the gas admission and gas exhaust ports configured in different directions, of which the ones not being used can be closed in a simple manner with the help of screw caps, and since adapting to different gas installations is possible by inserting function modules or blank modules may be configured in a flexible manner, the measuring device is easily adjustable to the local conditions by way of simple means.

What is claimed is:

1. A system for assembly into a gas consumption measuring device comprising:
   a) a slide valve function module for shutting off gas flow;

b) a slide valve blank module;
c) a pressure-control function module for controlling gas flow pressure;
d) a pressure-control blank module;
e) a housing, said housing defining a flow path, and including a front side having a first opening and a second opening, said first and second openings dividing said flow path into a first segment, a second segment, and a third segment;
f) a housing gas admission port defining a first end of said first segment of said flow path;
g) a housing gas exhaust port defining a second end of said third segment of said flow path;
h) a flowmeter permanently installed in said housing at a point in said flow path;
i) a slide valve basic module being releasably inserted in said first opening, having an inlet and an outlet defining a second flow path which couples a second end of said first segment and a first end of said second segment of said flow path, and defining a void which accommodates one of said slide valve function module and said slide valve blank module; and
j) a pressure-control basic module being releasably inserted in said second opening, having an inlet and an outlet defining a third flow path which couples a second end of said second segment and a first end of said third segment of said flow path, and defining a void which accommodates one of said pressure-control function module and said pressure-control blank module, whereby said system is configured as a gas consumption measuring device having any one of:
i) said slide valve functional module accommodated in said slide valve basic module and said pressure control functional module accommodated in said pressure control basic module;
ii) said slide valve functional module accommodated in said slide valve basic module and said pressure control blank module accommodated in said pressure control basic module;
iii) said slide valve blank module accommodated in said slide valve basic module and said pressure control functional module accommodated in said pressure control basic module; and
iv) said slide valve blank module accommodated in said slide valve basic module and said pressure control blank module accommodated in said pressure control basic module.

2. The gas consumption measuring device of claim 1, further comprising a replaceable battery arranged in said housing and wherein said flowmeter is an ultrasonic flowmeter and said replaceable battery energizes said flowmeter.

3. The gas consumption measuring device of claim 2, wherein said housing comprises right-angled wall elements, which are provided with a first group of connecting ports for gas admission and a second group of connecting ports for gas exhaust, wherein ports of the two groups are connected to one another in a gas conducting manner and are sealable gas-tight except for the ports being used at the time.

4. The gas consumption measuring device of claim 3, wherein said inlets and said outlets of the basic modules lie on two different planes of cross section and a ring seal is arranged between the two planes of cross section for each of the basic modules.

5. The gas consumption measuring device of claim 2, wherein said inlets and said outlets of the basic modules lie on two different planes of cross section and a ring seal is arranged between the two planes of cross section for each of the basic modules, 6. The gas consumption measuring device of claim 1, wherein said housing comprises right-angled wall elements, which are provided with a first group of connecting ports for gas admission and a second group of connecting ports for gas exhaust, wherein ports of the two groups are connected to one another in a gas conducting manner and are sealable gas-tight except for the ports being used at the time.

7. The gas consumption measuring device of claim 6, wherein said inlets and said outlets of the basic modules lie on two different planes of cross section and a ring seal is arranged between the two planes of cross section for each of the basic modules.

8. The gas consumption measuring device of claim 1, wherein said inlets and said outlets of the basic modules lie on two different planes of cross section and a ring seal is arranged between the two planes of cross section for each of the basic modules.

9. A system kit for assembly into a gas consumption measuring device comprising:
a) a slide valve function module for shutting off gas flow;
b) a slide valve blank module;
c) a pressure-control function module for controlling gas flow pressure;
d) a pressure-control blank module;
e) a housing, said housing defining a flow path, and including a front side having a first opening and a second opening, said first and second openings dividing said flow path into a first segment, a second segment, and a third segment;
f) a housing gas admission port defining a first end of said first segment of said flow path;
g) a housing gas exhaust port defining a second end of said third segment of said flow path;
h) a flowmeter permanently installed in said housing at a point in said flow path;
i) a slide valve basic module
for releasable insertion into said first opening,
having an inlet and an outlet which, when inserted into said first opening, define a second flow path which couples a second end of said first segment and a first end of said second segment of said flow path, and
defining a void which may accommodate one of said slide valve function module and said slide valve blank module; and p1 j) a pressure-control basic module
for releasable insertion into said second opening,
having an inlet and an outlet which, when inserted into said second opening, define a third flow path which couples a second end of said second segment and a first end of said third segment of said flow path, and
defining a void which may accommodate one of said pressure-control function module and said pressure-control blank module.

10. The gas consumption measuring device of claim 9, further comprising a replaceable battery arranged in said housing and wherein said flowmeter is an ultrasonic flowmeter and said replaceable battery energizes said flowmeter.

11. The gas consumption measuring device of claim 10, wherein said housing comprises right-angled wall elements, which are provided with a first group of connecting ports for gas admission and a second group of connecting ports for gas exhaust, wherein ports of the two groups are connected to one another in a gas conducting manner and are sealable gas-tight except for the ports being used at the time.

12. The gas consumption measuring device of claim 11, wherein said inlets and said outlets of the basic modules lie on two different planes of cross section and a ring seal is arranged between the two planes of cross section for each of the basic modules.

13. The gas consumption measuring device of claim 10, wherein said inlets and said outlets of the basic modules lie on two different planes of cross section and a ring seal is arranged between the two planes of cross section for each of the basic modules.

14. The gas consumption measuring device of claim 9, wherein said housing comprises right-angled wall elements, which are provided with a first group of connecting ports for gas admission and a second group of connecting ports for gas exhaust, wherein ports of the two groups are connected to one another in a gas conduction manner and are sealable gas-tight except for the ports being used at the time.

15. The gas consumption measuring device of claim 14, wherein said inlets and said outlets of the basic modules lie on two different planes of cross section and a ring seal is arranged between the two planes of cross section for each of the basic modules.

16. The gas consumption measuring device of claim 9, wherein said inlets and said outlets of the basic modules lie on two different planes of cross section and a ring seal is arranged between the two planes of cross section for each of the basic modules.

* * * * *

UNITED STATES PATENT AND TRADEMARK OFFICE
CERTIFICATE OF CORRECTION

PATENT NO. : 5,257,538
DATED : November 2, 1993
INVENTOR(S) : Karl D. Spendel

It is certified that error appears in the above-indentified patent and that said Letters Patent is hereby corrected as shown below:

On the Title Page, under Item [30], Foreign Application Priority Data; change the filing date from "April 12, 1989" to --December 4, 1989--.

Signed and Sealed this

Thirty-first Day of May, 1994

Attest:

BRUCE LEHMAN

Attesting Officer

Commissioner of Patents and Trademarks